(12) United States Patent
Meisner et al.

(10) Patent No.: US 6,964,017 B1
(45) Date of Patent: Nov. 8, 2005

(54) SYSTEM AND METHOD OF CREATING INTERACTIVE VISUAL CONTENT

(75) Inventors: Douglas E. Meisner, Minneapolis, MN (US); Alan L. Erickson, Highlands Ranch, CO (US); Troy A. Gaul, Shoreview, MN (US); Timothy N. Wright, Minneapolis, MN (US); Christopher P. Hondl, Minneapolis, MN (US); Doug J. Ahmann, Woodbury, MN (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 09/558,567

(22) Filed: Apr. 26, 2000

(51) Int. Cl.[7] ............................................. G06F 17/21
(52) U.S. Cl. ...................................................... 715/530
(58) Field of Search ............................. 715/501.1, 502, 715/526, 530

(56) References Cited

U.S. PATENT DOCUMENTS

| | | | | |
|---|---|---|---|---|
| 5,142,616 A | * | 8/1992 | Kellas et al. ................. | 345/634 |
| 5,627,959 A | * | 5/1997 | Brown et al. ................. | 345/853 |
| 5,742,768 A | * | 4/1998 | Gennaro et al. .................... | 1/1 |
| 6,121,970 A | * | 9/2000 | Guedalia ....................... | 345/760 |
| 6,178,432 B1 | * | 1/2001 | Cook et al. .................... | 715/513 |
| 6,314,569 B1 | * | 11/2001 | Chernock et al. .............. | 725/37 |
| 6,476,828 B1 | * | 11/2002 | Burkett et al. ................. | 715/760 |
| 6,618,063 B1 | * | 9/2003 | Kurtenbach .................... | 715/834 |

* cited by examiner

Primary Examiner—Joseph Feild
Assistant Examiner—Peter J. Smith
(74) Attorney, Agent, or Firm—Fish & Richardson P.C.

(57) ABSTRACT

A system and method of creating interactive visual content in which base visual content, a selection of a trigger event associated with the base visual content, and intermediate visual content are received as an input. Viewing visual content derived from the base visual content is automatically generated. The viewing visual content can be displayed by a viewing application executing on a computer. A set of regions of the interactive visual content in which swap visual content is to be displayed by the viewing application when the trigger event occurs is automatically generated. For example, regions of the viewing visual content that are to be replace by the swap visual content when the trigger event occurs can be identified. Also, the swap visual content is automatically generated from the intermediate visual content. In addition, instructions operable to cause the computer executing the viewing application to display the swap visual content in the identified regions when the trigger event occurs is automatically generated. Moreover, the intermediate visual content can be received by providing a user interface enabling a designer to edit the intermediate visual content as an integral unit.

22 Claims, 8 Drawing Sheets

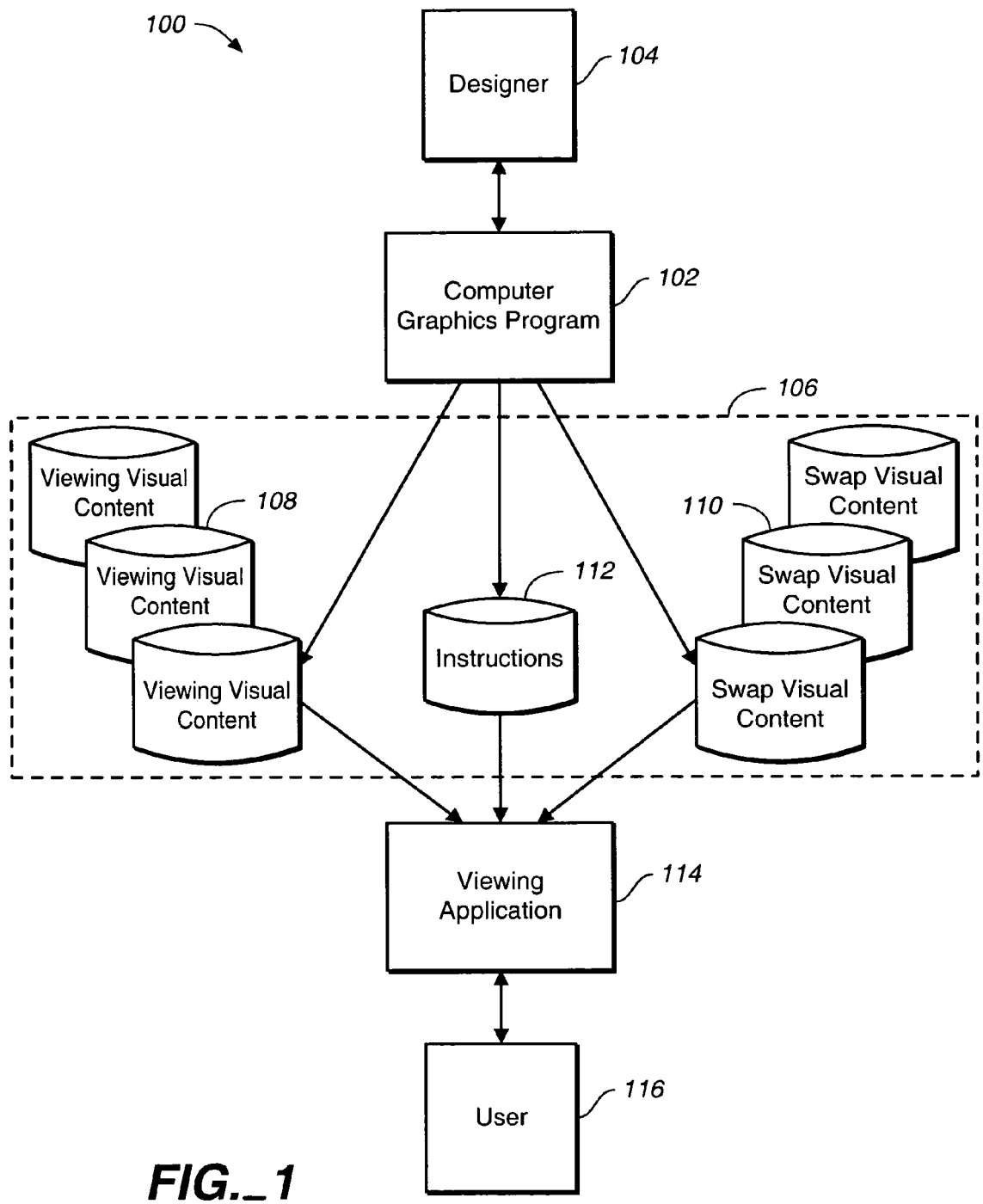
FIG._1

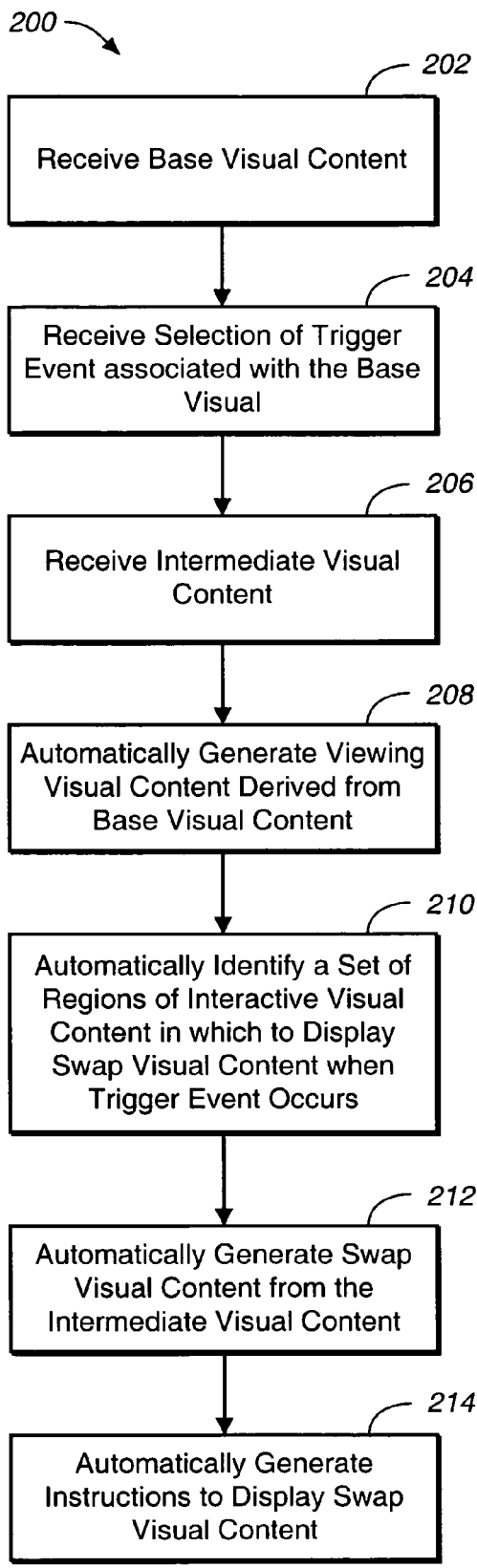
FIG._2
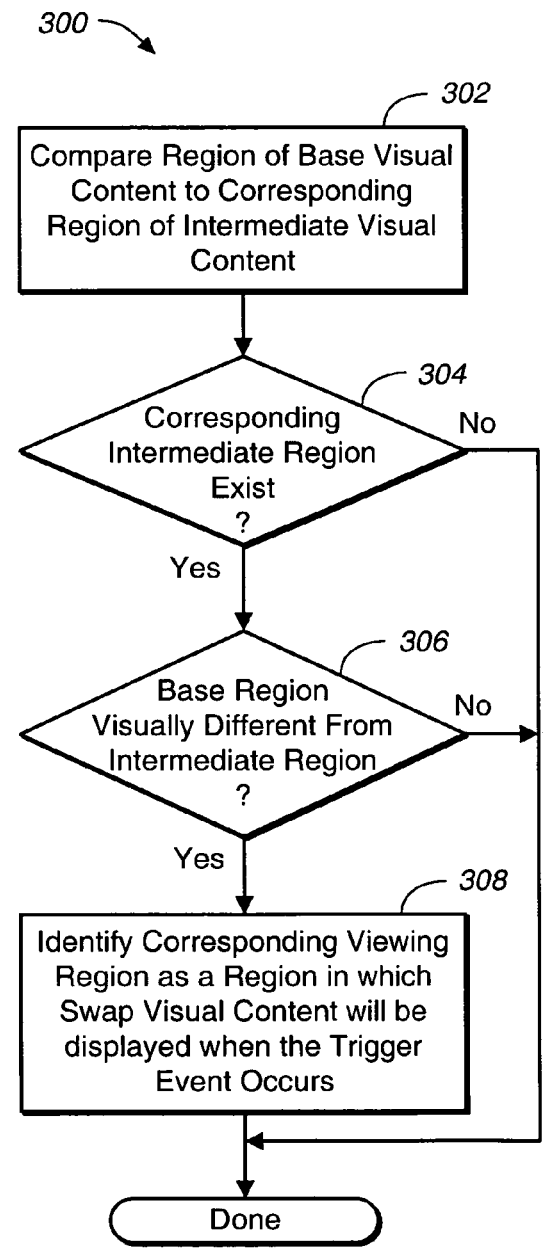
FIG._3

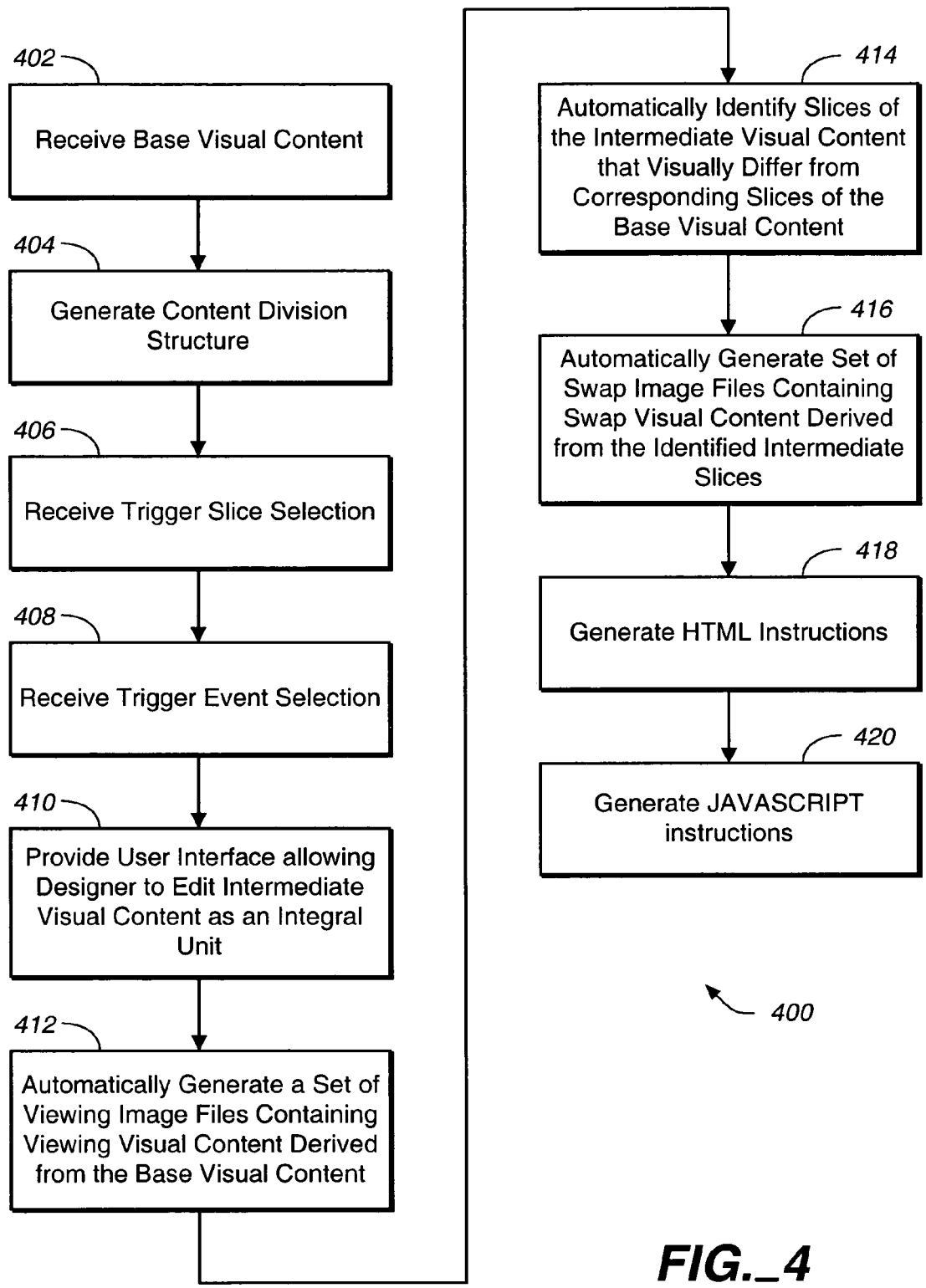
FIG._4

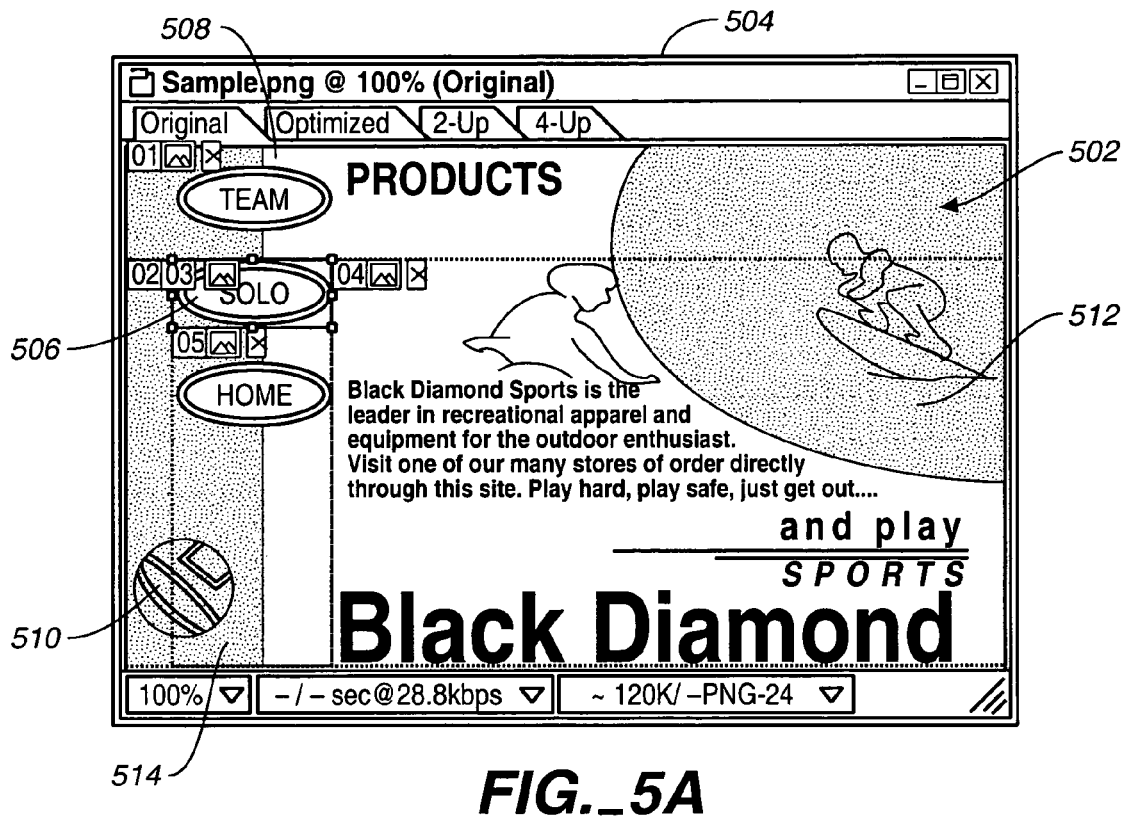
FIG._5A
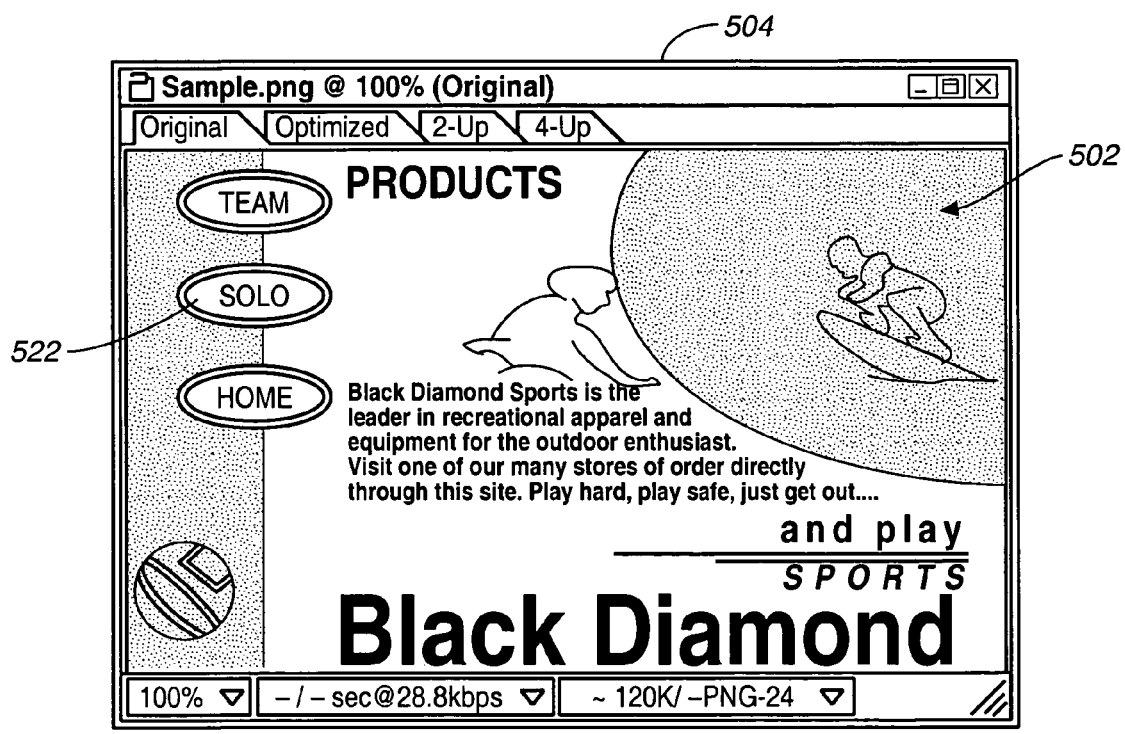
FIG._5B

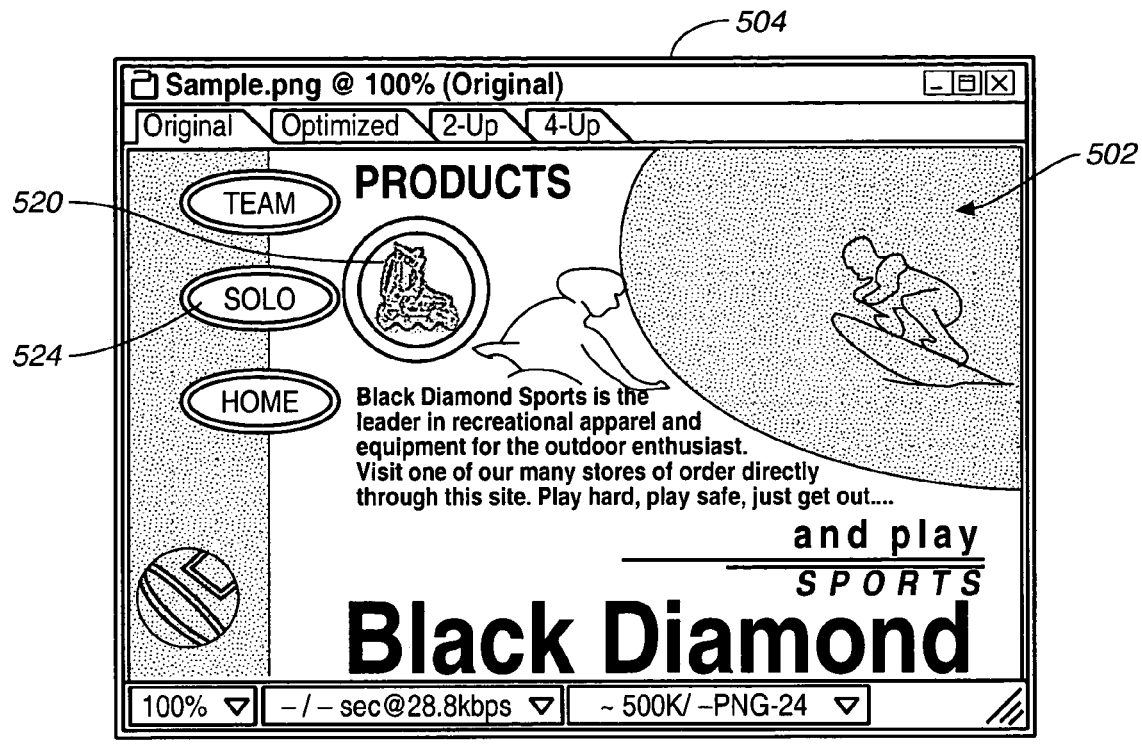
FIG._5C
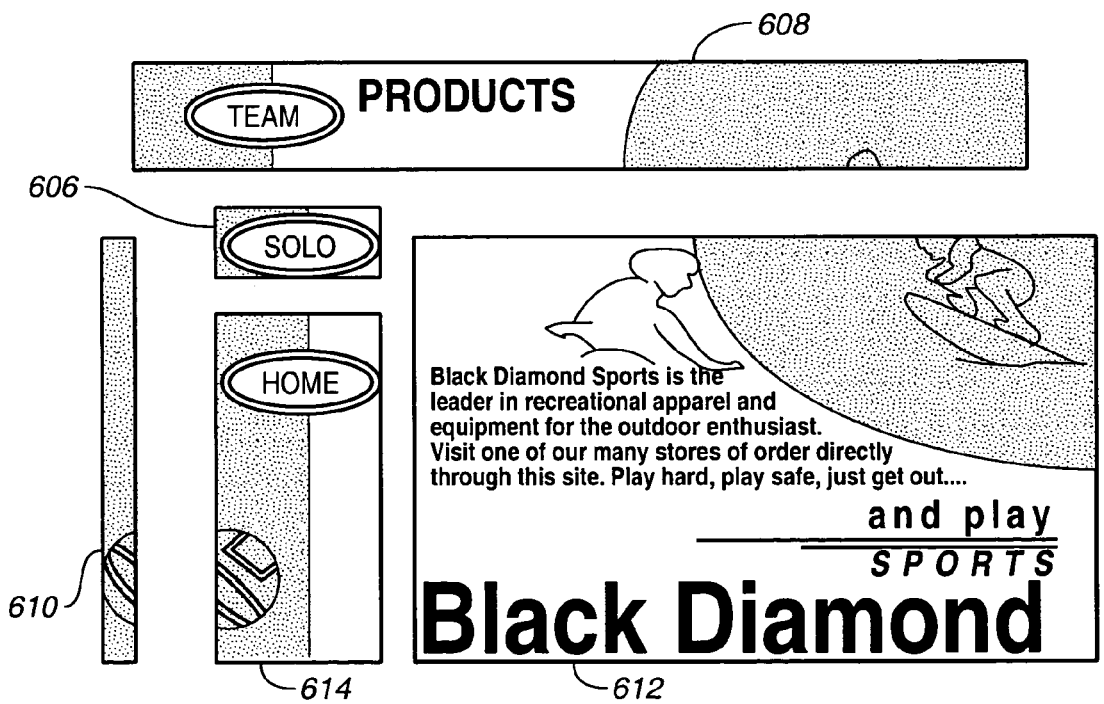
FIG._6

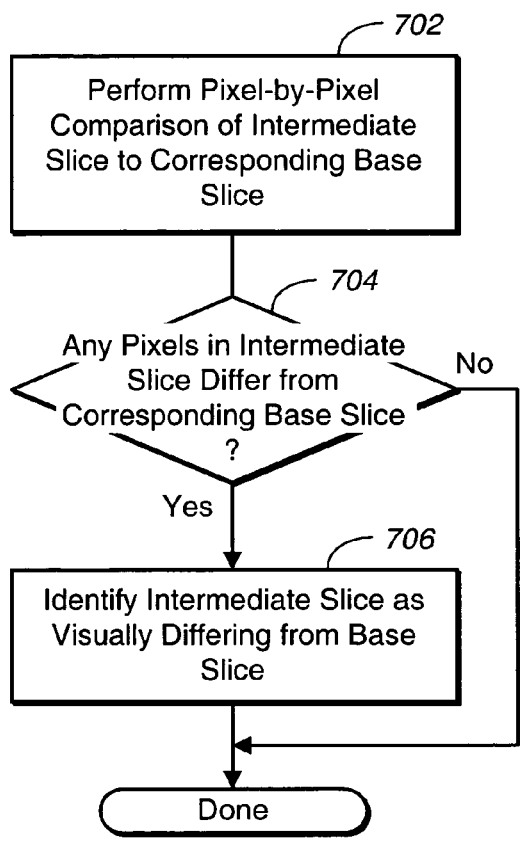
FIG._7
FIG._11

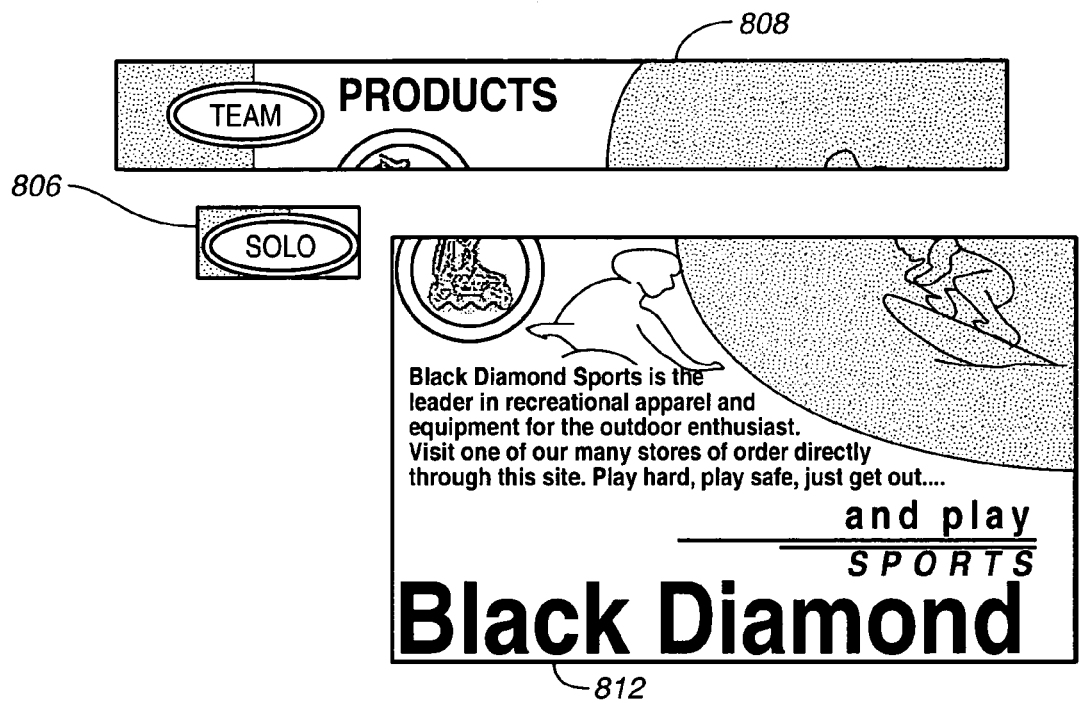
FIG._8
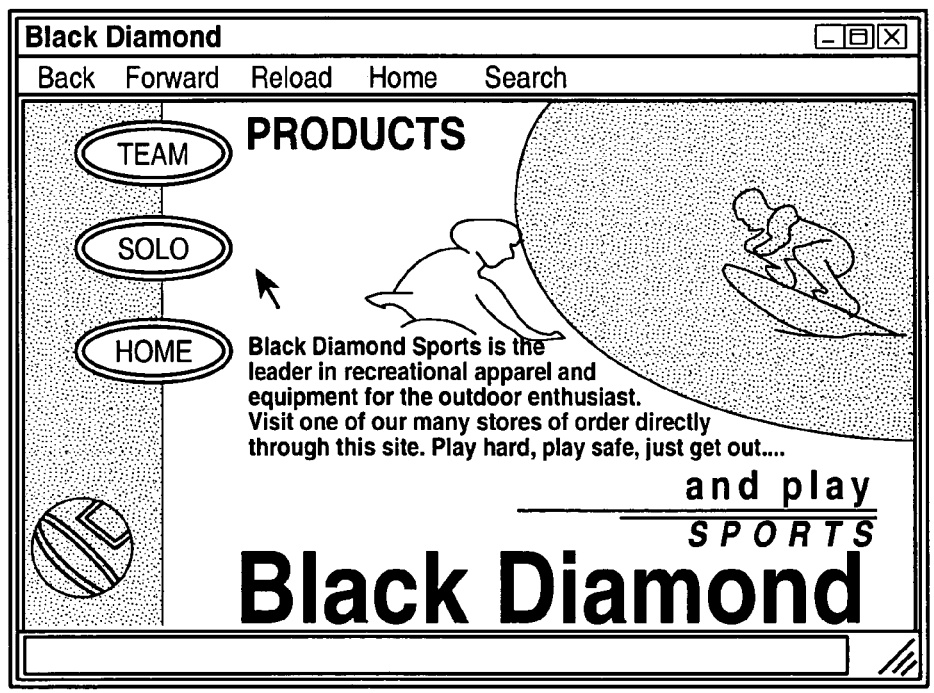
FIG._9

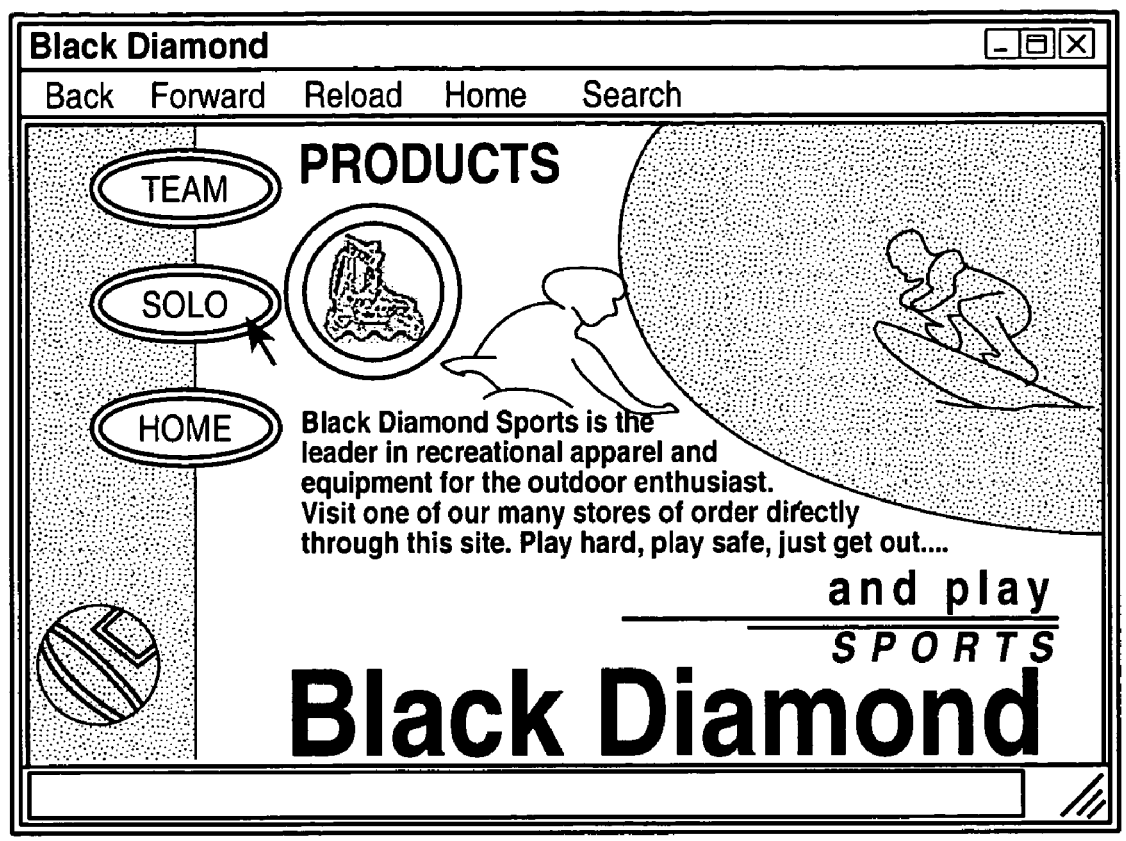
FIG._10

SYSTEM AND METHOD OF CREATING INTERACTIVE VISUAL CONTENT

BACKGROUND

This disclosure relates to systems and methods for creating interactive visual content.

A markup language is a tool for describing the structure and content of an electronic document that is to be viewed or printed on a computer output device such as a computer monitor or printer. Conventional markup languages typically include instructions for describing visual content that is displayed when the electronic document is viewed or printed. Such visual content can include text and graphics. For example, one such set of instructions can be used to retrieve and display an image stored at a specified location (e.g., on a disk drive). Conventional markup languages often also include instructions that allow a designer of such a document to embed user interface controls, applets, and scripts in the document. This allows the designer to create an interactive document that can receive information from a user viewing the document and/or perform some operation (e.g., perform a calculation or change the displayed visual content).

One example of a markup language is the hypertext markup language (HTML). HTML is commonly used to describe HTML documents that are read and displayed by web browser applications. It is common for such HTML documents to specify that one or more images are to be displayed by the web browser as a part of the HTML document. Typically, an web browser will retrieve an HTML document and any associated images from a remote server using a computer network such as the Internet. In order to facilitate transmission across a computer network, a large image associated with such an HTML document can be divided into several smaller slices, which can be separately stored and transmitted across the computer network to the web browser. When the web browser displays the HTML document, the browser typically reassembles the sliced image by displaying the slices in an HTML table.

Such image slicing techniques are also used to create visual effects such as "rollover" effects. For example, the designer of an HTML document can identify a particular slice of a sliced image as a trigger slice (also referred to as a "hotspot"). Then, the designer can embed JAVASCRIPT™ instructions in the HTML document, which are executed by the application used to view the document. The embedded instructions can include instructions that replace the trigger slice in the HTML table with a different image slice (referred to here as a "swap slice") when a specified user interface event occurs (referred to here as the "trigger event"). Instead of, or in addition to, swapping the trigger slice, the embedded instructions can include instructions that replace other slices in the HTML table with other swap slices when the trigger event occurs (this operation is commonly referred to as a "secondary rollover effect"). Examples of trigger events include the user moving the cursor over the trigger slice (commonly referred to as a "rollover" event), the user clicking a mouse button while the cursor is positioned over the trigger slice (commonly referred to as a "mouse down" event), and the user subsequently releasing the mouse button while the cursor is positioned over the trigger slice (commonly referred to as a "mouse up" event).

Manually creating such visual effects can be tedious, however. Some conventional computer graphics programs automatically generate the HTML and JAVASCRIPT instructions required to create such visual effects. Such conventional graphics programs typically require a designer of such an HTML document to identify manually image slices that the web browser will replace with swap slices when the trigger event occurs. After the designer has identified the image slices that will be replaced, such conventional computer graphics programs typically allow the designer to create each swap slice, for example, by editing a copy of the image slice that will be replaced. However, typically the designer must make such edits within the confines of the selected image slices.

SUMMARY

In general, in one aspect, the invention features a computer-implemented method of creating interactive visual content for display by a viewing application executing on a computer. The method can include receiving as an input a selection of a trigger event and receiving as an input intermediate visual content. The method can also include automatically identifying a plurality of regions of the interactive visual content in which swap visual content is to be displayed by the viewing application when the trigger event occurs. Moreover, the method can include automatically generating the swap visual content from the intermediate visual content.

Advantageous implementations include one or more of the following features. The method can also include generating instructions operable to cause the computer executing the viewing application to display the swap visual content in the identified regions when the trigger event occurs. Also, the method can include receiving as an input base visual content, and automatically generating viewing visual content from the base visual content for display by the viewing application. In the method, the trigger event can be associated with the base visual content.

Optionally, the method can include providing a content division structure that divides the viewing visual content into a plurality of sections. Automatically identifying the set of regions of the interactive visual content can also include automatically identifying those sections of the visual content in which swap visual content is to be displayed by the viewing application when the trigger event occurs.

In another aspect, a computer program product is tangibly stored on a computer-readable medium for generating interactive visual content to be displayed by a viewing application executing on a computer. The computer program product can include program instructions operable to cause a programmable processor to receive as an input a selection of a trigger event associated and receive as an input intermediate visual content. The computer program product also can include program instructions operable to cause a programmable processor to automatically identify a set of regions of the interactive visual content in which swap visual content is to be displayed by the viewing application when the trigger event occurs, and automatically generate the swap visual content from the intermediate visual content.

Advantageous implementations include one or more of the following features. The computer program product can include program instructions operable to cause the programmable processor to generate output instructions operable to cause the computer executing the viewing application to display the swap visual content in the identified regions when the trigger event occurs. Also, the computer program product can include program instructions operable to cause the programmable processor to receive as an input base visual content, and automatically generate viewing visual content derived from the base visual content for display by the viewing application. The trigger event can be associated with the base visual content.

Optionally, the computer program product can include program instructions operable to cause the programmable processor to provide a content division structure that divides the viewing visual content into a plurality of sections, and automatically identify those sections of the visual content in which swap visual content is to be displayed by the viewing application when the trigger event occurs.

Advantages that can be seen in implementations of the invention include one or more of the following. A computer graphics program can automatically identify those portions of interactive visual content in which swap visual content is to be displayed when a trigger event occurs. By using such a computer graphics program, a designer can create interactive visual content without having to identify manually such portions of the interactive visual content. Such an identification operation can identify those portions of the intermediate visual content that visually differ from the base visual content. In this way, the amount of swap visual content (which is generated from the identified portions of the intermediate visual content) can be reduced. This can reduce the time and resources necessary to transmit and display the swap visual content (especially over a computer network such as the Internet).

One way in which such an identification operation can be performed is by calculating a checksum for a given slice of the intermediate visual content and a checksum for the corresponding slice of the base visual content. For example, cyclic redundancy check (CRC) checksums can be calculated, in a conventional manner, using the pixel data for the given slice of the intermediate visual content and the corresponding slice of the base visual content, respectively. The CRC checksums can be calculated each time the designer makes an edit that affects the slice of the intermediate visual content and/or the corresponding slice of the base visual content. Then, if it is determined that the checksum for the slice of the intermediate visual content differs from the checksum for the base visual content, that slice of the intermediate visual content can be identified as visually differing from the corresponding slice of the base visual content. The use of such checksums can improve the performance of such an identification operation.

Also, a computer graphics program can provide a user interface enabling a designer to edit intermediate visual content as an integral unit. This allows the designer to edit intermediate visual content used to generate swap visual content without regard to slice or region boundaries.

The details of one or more embodiments of the invention are set forth in the drawings and the description below. Other features, objects, and advantages of the invention will be apparent from the description and drawings, and from the claims.

DESCRIPTION OF DRAWINGS

FIG. 1 is a block diagram of a system for creating interactive visual content.

FIG. 2 is a flow diagram of a process for generating interactive visual content.

FIG. 3 is flow diagram of an operation that can be performed on each region of the base visual content to automatically identify a set of regions of the viewing visual content in which a viewing application is to display swap visual content when a trigger event occurs.

FIG. 4 is flow diagram of a process for creating an interactive HTML document using a computer graphics program.

FIG. 5A shows an example of a sliced image.

FIGS. 5B–5C show an example of a user interface that allows a designer to edit intermediate visual content as an integral unit.

FIG. 6 is a schematic representation of a set of viewing image files generated from a base visual content of the image shown in FIGS. 5A–5C.

FIG. 7 is a flow diagram of an operation that automatically identifies slices of intermediate visual content that visually differ from corresponding slices of base visual content.

FIG. 8 is a schematic representation of a set of swap image files generated from slices of the intermediate visual content of the image shown in FIGS. 5A–5C.

FIG. 9 shows a viewing application displaying the visual content shown in FIG. 6.

FIG. 10 shows a viewing application displaying the swap content shown in FIG. 8.

FIG. 11 is a flow diagram of an alternative operation that automatically identifies slices of intermediate visual content that visually differ from corresponding slices of base visual content.

Like reference symbols in the various drawings indicate like elements.

DETAILED DESCRIPTION

FIG. 1 is a block diagram of a system 100 for creating interactive visual content. The system 100 includes a computer graphics program 102 that is operated by a designer 104 of interactive visual content. In response to input from the designer 104, the computer graphics program 102 generates interactive visual content 106. The interactive visual content 106 includes viewing visual content 108, swap visual content 110, and instructions 112. The viewing visual content 108 and swap visual content 110 can include any type of electronic image, which can include textual and/or non-textual elements. For example, the viewing visual content 108 and the swap visual content 110 can be raster images and/or vector images.

A viewing application 114 reads the interactive visual content 106 and initially displays at least a portion of the viewing visual content 108 for a user 116. The instructions 112 included in the interactive visual content 106 can include instructions that cause the viewing application 114 to replace one or more portions of the viewing visual content 108 with one or more corresponding portions of the swap visual content 110. One example of interactive visual content 106 is an HTML document that includes a sliced image and embedded JAVASCRIPT instructions for swapping one or more image slices with one or more corresponding swap slices.

FIG. 2 is a flow diagram of a process 200 for generating interactive visual content. The computer graphics program 102 can be implemented using the process 200. Process 200 includes receiving base visual content (block 202). The base visual content will be used to generate the viewing visual content that the viewing application 114 initially displays. The base visual content can include any type of electronic image, including textual and/or non-textual elements. For example, the base visual content can be received by having a designer create an image using image creation and editing features included in the computer graphics program 102 (e.g., the image creation and editing features of the type found in the ADOBE PHOTOSHOP® computer graphics program). Other examples of receiving base visual content include retrieving an image from electronic storage (e.g., by retrieving an image file from a disk drive) and copying at least a portion of an existing image.

Process 200 also includes receiving a selection of a trigger event associated with the base visual content (block 204). Any event can be selected as the trigger event, including, for example, user interface events such as moving the cursor over a specified portion of the interactive visual content, pressing and/or releasing a mouse button while the cursor is located over the specified portion of the interactive visual content, or pressing a specified key on the keyboard. For example, the selection can be received by having the designer input information indicative of a selected event by manipulating conventional graphical user interface elements such as menus, buttons, and/or selection lists in order to select a trigger event. Alternatively, a default trigger event can be retrieved and used as the trigger event unless the designer explicitly selects a different trigger event.

Then, intermediate visual content is received (block 206). The intermediate visual content is used to generate swap visual content that the viewing application 114 will display in place of portions of the viewing visual content when the trigger event occurs. Each region of the intermediate visual content corresponds to a region of the base visual content (though not every region of the base visual content need have a corresponding region of the intermediate visual content). The intermediate visual content can include any type of electronic image, including textual and/or non-textual elements. For example, the intermediate visual content can be received by having the designer create an image using image creation and editing features included in the computer graphics program 102. Other examples of receiving intermediate visual content include retrieving an image from electronic storage (e.g., by retrieving an image file from a disk drive) and copying at least a portion of an existing image (e.g., the base visual content).

Process 200 also includes automatically generating viewing visual content derived from the base visual content (block 208). As noted above, the viewing application 114 initially displays at least a portion of the viewing visual content. Each region of the viewing visual content has a corresponding region in the base visual content, and each region of the intermediate visual content has a corresponding region of the viewing visual content. Parameters that specify how the viewing visual content is to be generated automatically can be received, for example, from the designer; instead, or in addition, default parameters can be used. The viewing visual content can be generated by simply copying the base visual content. Alternatively, various image processing operations can be performed on the base visual content in order to generate the viewing visual content. For example, the format in which the viewing visual content is stored can be changed from the format in which the base visual content was stored (e.g., to improve the compression of the viewing visual content for transmission over a computer network). Also, the colors of the base visual content can be mapped to web-safe colors in order to optimize the viewing visual content for display by the viewing application 114.

Process 200 further includes automatically identifying a set of regions of the interactive visual content in which the viewing application 114 is to display swap visual content when the trigger event occurs (block 210). For example, regions of the viewing visual content that are to be replaced by swap visual content when the trigger event occurs can be automatically identified. These regions of the viewing visual content are identified using the intermediate visual content. FIG. 3 is flow diagram of an operation 300 that can be performed on each region of the base visual content to identify automatically this set of regions of the viewing visual content. A given region of the base visual content is compared to the corresponding region of the intermediate visual content, if one exists (block 302). If there is a corresponding region of the intermediate visual content for the given region of the base visual content and the corresponding region of the intermediate visual content visually differs from that region of the base visual content (which is checked in blocks 304 and 306), then the region of the viewing visual content corresponding to that region of the base intermediate region is identified as a region in which swap visual content will be displayed when the trigger event occurs (block 308).

In addition, process 200 includes automatically generating swap visual content from the intermediate visual content (block 212 shown in FIG. 2). Each region of the intermediate visual content that corresponds to a region of the viewing visual content that is to be replaced by swap content when the trigger event occurs is used to generate the swap visual content for that region of the viewing visual content. The swap visual content can be generated in the same general manner as the viewing visual content.

Process 200 can also include generating instructions that cause the viewing application 114 to display the swap visual content in the identified regions of the interactive visual content when trigger event occurs (block 214). For example, the instructions can cause the viewing application to replace identified regions of the viewing visual content with swap visual content when the trigger event occurs. The instructions can be embedded in the interactive visual content or otherwise supplied to the viewing application 114. For example, the instructions can include JAVASCRIPT instructions that are embedded in an HTML document.

One implementation of process 200 is shown in FIG. 4. FIG. 4 is a flow diagram of a process 400 for creating an interactive HTML document using a computer graphics program 102. The computer graphics program 102 can generate the visual components of the interactive HTML document, for example, from an image created by the designer 104 using the computer graphics program 102. Process 400 includes having the computer graphics program 102 receive base visual content (block 402). The designer can edit (which, as used herein, refers to both creating and modifying) the image in order to create base visual content, e.g., using image creation and editing features included in the computer graphics program 102. Other ways in which the base visual content can be received include retrieving the base visual content from electronic storage (e.g., by retrieving an image file containing the base visual content from a disk drive) and/or copying at least a portion of one or more other images.

Then, the computer graphics program 102 generates a content division structure (block 404). The content division structure is used to divide the base visual content, the intermediate visual content, and the viewing visual content into multiple regions. The content division structure can be generated by dividing the image into multiple slices. The designer can create—using slice creation tools included in the computer graphics program 102—one or more slices of the image. Then, the computer graphics program 102 can generate other slices so that a valid HTML table can be assembled and displayed using the portions of the image defined by the slices (including both the designer-created slices and the program-generated slices). For example, FIG. 5A shows an example of an image 502 displayed in a window 504 of the computer graphics program 102. In the example shown in FIG. 5A, the designer has created a first slice 506 using a slice creation tool included in the computer graphics program 102. The computer graphics program 102 then generates other slices 508, 510, 512, and 514 so that a valid HTML table can be assembled and displayed using the portions of the image 502 defined by the slices 506, 508, 510, 512, and 514.

Then, the computer graphics program 102 receives a selection of a trigger slice (block 406). The trigger slice can be received by having the designer identify one of the slices defined by the content division structure. For example, as shown in FIG. 5A, the designer can select slice 506 as the trigger slice. The computer graphics program 102 then receives a selection of a trigger event associated with the trigger slice (block 408 shown in FIG. 4). Any event can be selected as the trigger event. The computer graphics program 102 can display one or more user interface elements, such as menus, windows, buttons, and the like, by which the designer can select a trigger event for the trigger slice. For example, the computer graphics program 202 can receive a selection of a rollover event to associate with the trigger slice 506 of the image 502 shown in FIG. 5A. Such a rollover event occurs when the user 116 of the viewing application 114 moves the cursor over the trigger slice 506. A default trigger event can be used if the designer does not explicitly provide such a trigger event selection.

Then, the computer graphics program 102 provides the designer with a user interface that allows the designer to edit intermediate visual content as an integral unit (block 410 of FIG. 4). Thus, the designer need not confine his or her edits to a pre-selected slice or region. Instead, the designer can freely edit the intermediate visual content without regard to slice or region boundaries. The designer can edit (which, as used herein, refers to both creating and modifying) the image in order to create intermediate visual content, e.g., using image creation and editing features included in the computer graphics program 102. As shown in FIG. 5B, the computer graphics program 102 can display the image 502 in the window 504 after the designer has selected a trigger slice and a trigger event; to edit (that is, to create and modify) intermediate visual content, the designer can edit the image without regard to slice or region boundaries. For example, as shown in FIG. 5C, the designer can add a button 524 to the image so that the button 524 is displayed instead of the button 522 (which is displayed as a part of the base visual content). Also, the designer can add a picture 520 of an inline skate to the image. The resulting intermediate visual content is shown in FIG. 5C. As shown in FIG. 5C, the intermediate visual content can also include portions of the base visual content. The computer graphics program 102 keeps track of which portions of the image are associated with the base visual content and/or the intermediate visual content in a conventional manner.

When the designer has completed editing the various the image, the designer can cause the computer graphics program 102 to generate automatically a set of viewing image files containing viewing visual content derived from the base visual content (block 412 shown in FIG. 4). The computer graphics program 102 can be programmed to generate a separate viewing image file for each of the slices of the base visual content. The computer graphics program 102 can be programmed to optimize each viewing image file for transmission over a computer network (e.g., by saving the viewing image file in a format that minimizes the size of the file while still maintaining the desired image quality) and/or for display using web browsers (e.g., by mapping colors contained in the file to web-safe colors). Other types of image processing can be used to generate the viewing image files. The set of viewing image files are typically stored on a disk drive or other electronic storage medium.

For example, a schematic representation of a set of viewing image files generated from the base visual content of the image 502 is shown in FIG. 6. The computer graphics program 102 can generate a viewing image file 606 containing viewing visual content derived from the trigger slice 506 of the base visual content. Also, the computer graphics program 102 can generate viewing image files 608, 610, 612, and 614 containing viewing visual content derived from the slices 508, 510, 512, and 514, respectively, of the base visual content.

As a part of generating an interactive HTML document from the image, the computer graphics program 102 automatically identifies slices of the intermediate visual content that visually differ from corresponding slices of the base visual content (block 414 shown in FIG. 4). In this way, the amount of swap visual content (which is generated from the identified slices of the intermediate visual content) can be reduced. This can reduce the time and resources necessary to transmit and display the swap visual content (especially over a computer network such as the Internet). One implementation of such an identification operation that is performed for each slice is shown in FIG. 7. The computer graphics program 102 can be programmed to perform, for a given slice of the intermediate visual content, a pixel-by-pixel comparison of that slice to the corresponding slice of the base visual content (block 702). If the computer graphics program 102 determines that any pixel in the slice of the intermediate visual content differs from the corresponding pixel in the corresponding slice of the base visual content (which is checked in block 704), the computer graphics program 102 identifies that slice of the intermediate visual content as visually differing from the corresponding slice of the base visual content (block 706). For example, after performing such a comparison between the intermediate and base visual content, the computer graphics program 102 identifies slices 506, 508, and 512 of the intermediate visual content as visually differing from corresponding slices of the base visual content.

Another implementation of such an identification operation that is performed for each slice is shown in FIG. 11. The computer graphics program 102 can be programmed to calculate a checksum for a given slice of the intermediate visual content and a checksum for the corresponding slice of the base visual content (blocks 1102 and 1104). For example, the computer graphics program 102 can calculate cyclic redundancy check (CRC) checksums, in a conventional manner, using the pixel data for the given slice of the intermediate visual content and the corresponding slice of the base visual content, respectively. The CRC checksums can be calculated each time the designer makes an edit that affects the slice of the intermediate visual content and/or the corresponding slice of the base visual content. Then, if the computer graphics program 102 determines that the checksum for the slice of the intermediate visual content differs from the checksum for the base visual content (which is checked in block 1106), the computer graphics program 102 identifies that slice of the intermediate visual content as visually differing from the corresponding slice of the base visual content (block 1108). The use of such checksums can improve the performance of such an identification operation.

After identifying slices of the intermediate visual content that visually differ from corresponding slices of the base visual content, the computer graphics program 102 automatically generates a set of swap image files containing swap visual content derived from the identified slices of the intermediate visual content (block 416 shown in FIG. 4). The set of swap image files includes a separate swap image file for each identified slice of the intermediate visual content. The computer graphics program 102 can be programmed to optimize each swap image file for transmission over a computer network (e.g., by saving the swap image file in a format that minimizes the size of the file while still maintaining the desired image quality) and/or for display using web browsers (e.g., by mapping colors contained in the file to web-safe colors). Other types of image processing can also be used to generate the swap image files. The set of swap image files are typically stored on a disk drive or other electronic storage medium.

For example, a schematic representation of a set of swap image files generated from identified slices 506, 508, and 512 of the intermediate visual content is shown in FIG. 8. The computer graphics program 102 generates a swap image file 806 containing swap visual content derived from the trigger slice 506 of the intermediate visual content. Also, the computer graphics program 102 generates swap image files 808 and 812 containing swap visual content derived from the slices 508 and 512, respectively, of the intermediate visual content.

The computer graphics program 102 also generates HTML instructions that cause the viewing visual content contained in the viewing image files to be displayed as a valid HTML table (block 418 shown in FIG. 4). The instructions are included in the interactive HTML document and are executed by the viewing application 114 that displays the HTML document. The instructions arrange the visual content from each of the viewing image files so that the slice arrangement of the image is reproduced. For example, the instructions generated for the image 502 include instructions that cause the viewing application 114 to display the viewing visual content contained in the viewing image files 606, 608, 610, 612, and 614 as shown in FIG. 9. This reproduces the slice arrangement of the image 502. As a result, the HTML table has a similar appearance to the base visual content of the image 502 from which the HTML document was generated.

The computer graphics program 102 also generates JAVASCRIPT instructions that cause the swap visual content to be displayed when the trigger event occurs to the trigger slice (block 420 shown in FIG. 4). The JAVASCRIPT instructions are embedded in the interactive HTML document and are executed by the viewing application 114 that displays the HTML document. For each swap image file associated with the interactive HTML document, the JAVASCRIPT instructions cause the viewing application 114 to replace the viewing visual content corresponding to that swap image file with the swap visual content contained in that swap image file when the trigger event occurs to the trigger slice. As a result, after trigger event occurs to trigger slice, the HTML table has a similar appearance to the intermediate visual content of the 502 image from which the HTML document was generated.

For example, the JAVASCRIPT instructions generated for the image 502 include instructions that cause the viewing application 114 that displays the interactive HTML document generated from the image 502 to replace the viewing visual content from viewing image files 606, 608, and 612 displayed in the HTML table with the swap visual content from swap image files 806, 808, and 812, respectively, when a rollover event occurs to the trigger slice portion of the displayed HTML table, as shown in FIG. 10.

The JAVASCRIPT instructions can also include instructions that, when some other event occurs to the trigger slice, cause the viewing application to redisplay the viewing visual content that was replaced with the swap visual content. For example, if the trigger event is a rollover event, the other event can be an event associated with the user of the viewing application 114 moving the cursor off of the trigger slice. In such a case, the JAVASCRIPT instructions can include instructions that cause the viewing application 114 to replace in the HTML table the swap visual content from swap image files 806, 808, and 812 with the viewing visual content from viewing image files 606, 608, and 612, respectively, when the user of the viewing application 114 moves the cursor off of the trigger slice.

An example of an interactive HTML document generated according to process 400 is shown in TABLE 1. The interactive HTML document shown in TABLE 1 includes embedded JAVASCRIPT instructions for displaying the viewing image files 606, 608, 610, 612, and 614 in an HTML table. The embedded JAVASCRIPT instructions also include instructions for replacing viewing image files 606, 608, and 612 with the swap image files 806, 808, and 812, respectively, when the trigger event occurs. The viewing image files 606, 608, 610, 612, and 614 and the swap image files 806, 808, and 812 are stored together in a common "images" subdirectory associated with the interactive HTML document.

TABLE 1

```
<HTML>
<HEAD>
<TITLE>Sample</TITLE>
<META HTTP-EQUIV="Content-Type" CONTENT="text/html;
charset=iso-8859-1">
<!-- ImageReady Preload Script (Sample.png) -->
<SCRIPT LANGUAGE="JavaScript">
<!--
function newImage(arg) {
    if (document.images) {
        rslt = new Image( );
        rslt.src = arg;
        return rslt;
    }
}
function changeImages( ) {
    if (document.images && (preloadFlag == true)) {
        for (var i=0;
i<changeImages.arguments.length; i+=2) {
            document [changeImages.arguments[i]].src =
changeImages.arguments[i+1];
        }
    }
}
var preloadFlag = false;
function preloadImages( ) {
    if (document.images) {
        Sample_01_Sample_03_over =
newImage("images/Sample_01-Sample_03_over.png");
        Sample_03_over =
newImage("images/Sample_03-over.png");
        Sample_04_Sample_03_over =
newImage("images/Sample_04-Sample_03_over.png");
        preloadFlag = true;
    }
}
// -->
</SCRIPT>
<!-- End Preload Script -->
</HEAD>
<BODY BGCOLOR=#FFFFFF ONLOAD="preloadImages( );">
```

TABLE 1-continued

```
<!-- ImageReady Slices (Sample.png) -->
<TABLE BORDER=0 CELLPADDING=0 CELLSPACING=0>
    <TR>
        <TD COLSPAN=3>
            <IMG NAME="Sample_01"
SRC="images/Sample_01.png" WIDTH=390 HEIGHT=53></TD>
    </TR>
    <TR>
        <TD ROWSPAN=2>
            <IMG SRC="images/Sample_02.png"
WIDTH=20 HEIGHT=187></TD>
        <TD>
            <A HREF="#"
ONMOUSEOVER="changeImages('Sample_01',
'images/Sample_01-Sample_03_over.png', 'Sample_03',
'images/Sample_03-over.png', 'Sample_04',
'images/Sample_04-Sample_03_over.png'); return true;"
ONMOUSEOUT="changeImages('Sample_01',
'images/Sample_01.png', 'Sample_03',
'images/Sample_03.png', 'Sample_04',
'images/Sample_04.png'); return true;">
                <IMG NAME="Sample_03"
SRC="images/Sample_03.png" WIDTH=71 HEIGHT=31
BORDER=0></A></TD>
        <TD ROWSPAN=2>
            <IMG NAME="Sample_04"
SRC="images/Sample_04.png" WIDTH=299 HEIGHT=187></TD>
    </TR>
    <TR>
        <TD>
            <IMG SRC="images/Sample_05.png"
WIDTH=71 HEIGHT=156></TD>
    </TR>
</TABLE>
<!-- End ImageReady Slices -->
</BODY>
</HTML>
```

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method operations of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

A number of embodiments of the invention have been described. Nevertheless, it will be understood that various modifications may be made without departing from the spirit and scope of the invention. For example, method operations can be performed in different orders. Also, the interactive visual content can be generated using other languages and technologies including, for example, cascading style sheets and/or JAVA™ applets or applications. Accordingly, other embodiments are within the scope of the following claims.

What is claimed is:

1. A computer program product, tangibly stored on a computer-readable medium, comprising instructions operable to cause a computer to:
   receive as an input base visual content;
   generate a content division structure that divides the base visual content into a plurality of image slices, including instructions operable to cause the computer to generate user-created slices and program-generated slices;
   receive input from a user selecting one of the plurality of image slices as a trigger slice and an input selecting a trigger event to associate with the trigger slice;
   receive input from the user defining intermediate visual content for each trigger event, including instructions operable to cause the computer to allow the user to create and modify intermediate visual content as an integral image without regard to boundaries of user-created slices and program-generated slices;
   generate a set of viewing image files containing viewing visual content derived from the base visual content;
   use the content division structure to divide the intermediate visual content and the viewing visual content into slices corresponding to the slices of the base visual content; and
   computationally compare the base visual content and the intermediate visual content identify image slices where the base visual content and the intermediate visual content differ visually and generate a set of swap image files containing swap visual content derived from the identified image slices of the intermediate visual content.

2. The computer program product of claim 1, further comprising instructions operable to cause a computer to:
   a generate a set of HTML instructions that cause the viewing visual content to be displayed as a valid HTML table; and
   generate a set of JAVASCRIPT instructions that cause the swap visual content to be displayed when the trigger event occurs to the trigger slice.

3. The computer program product of claim 1, wherein the swap image files are optimized for transmission over a computer network.

4. The computer program product of claim 1, wherein each slice of the base visual content and the intermediate visual content is computationally compared pixel-by-pixel.

5. The computer program product of claim 1, wherein each slice of the base visual content and the intermediate visual content is computationally compared by comparing a checksum value calculated for each slice of the base visual content and a checksum value calculated for the corresponding slice of the intermediate visual content.

6. The computer program product of claim 1, further comprising instructions operable to cause a computer to:
   receive as an input a user division structure for the base visual content; and
   generate the content division structure to conform to the user division structure.

7. A computer-implemented method of creating interactive visual content for display by a viewing application executing on a computer, the method comprising:
   receiving as an input base visual content;
   generating a content division structure that divides the base visual content into a plurality of image slices, including instructions operable to cause the computer to generate user-created slices and program-generated slices;
   receiving input from a user selecting one of the plurality of image slices as a trigger slice and an input selecting a trigger event to associate with the trigger slice;
   receiving input from the user defining intermediate visual content for each trigger event, including instructions operable to cause the computer to allow the user to create and modify intermediate visual content as an integral image without regard to boundaries of user-created slices and program-generated slices;
   generating a set of viewing image files containing viewing visual content derived from the base visual content;
   using the content division structure to divide the intermediate visual content and the viewing visual content into slices corresponding to the slices of the base visual content; and
   computationally comparing the base visual content and the intermediate visual content, identifying image slices where the base visual content and the intermediate visual content differ visually and generating a set of swap image files containing swap visual content derived from the identified image slices of the intermediate visual content.

8. The method of claim 7, further comprising:
   generating a set of HTML instructions that cause the viewing visual content to be displayed as a valid HTML table; and
   generating a set of JAVASCRIPT instructions that cause the swap visual content to be displayed when the trigger event occurs to the trigger slice.

9. The method of claim 7, wherein the swap image files are optimized for transmission over a computer network.

10. The method of claim 7, wherein each slice of the base visual content and the intermediate visual content is computationally compared pixel-by-pixel.

11. The method of claim 7, wherein each slice of the base visual content and the intermediate visual content is computationally compared by comparing a checksum value calculated for each slice of the base visual content and a checksum value calculated for the corresponding slice of the intermediate visual content.

12. The method of claim 7, further comprising:
   receiving as an input a user division structure for the base visual content; and
   generating the content division structure to conform to the user division structure.

13. A computer program product, tangibly stored on a computer-readable medium, comprising instructions operable to cause a computer to:
   a receive as an input base visual content;
   receive as an input a user-defined image division structure dividing the base visual content;
   generate a content division structure that divides the base visual content into a plurality of image slices, including instructions operable to cause the computer to generate image slices corresponding to the user defined image division structure;
   receive input from a user selecting one of the plurality of image slices as a trigger slice and an input selecting a trigger event to associate with the trigger slice;
   receive input from the user defining intermediate visual content for each trigger event, including instructions operable to cause the computer to allow the user to create and modify intermediate visual content as an integral image without regard to boundaries of user-created slices and program-generated slices;
   generate a set of viewing image files containing viewing visual content derived from the base visual content;
   use the content division structure to divide the intermediate visual content and the viewing visual content into slices corresponding to the slices of the base visual content; and
   computationally compare the base visual content and the intermediate visual content, identify image slices where the base visual content and the intermediate visual content differ visually and generate a set of swap image files containing swap visual content derived from the identified image slices of the intermediate visual content.

14. The computer program product of claim 13, further comprising instructions operable to cause a computer to:
   generate a set of HTML instructions that cause the viewing visual content to be displayed as a valid HTML table; and
   generate a set of JAVASCRIPT instructions that cause the swap visual content to be displayed when the trigger event occurs to the trigger slice.

15. The computer program product of claim 13, wherein the swap image files are optimized for transmission over a computer network.

16. The computer program product of claim 13, wherein each slice of the base visual content and the intermediate visual content is computationally compared pixel-by-pixel.

17. The computer program product of claim 13, wherein each slice of the base visual content and the intermediate visual content is computationally compared by comparing a checksum value calculated for each slice of the base visual content and a checksum value calculated for the corresponding slice of the intermediate visual content.

18. A computer-implemented method of creating interactive visual content for display by a viewing application executing on a computer, the method comprising:
   receiving as an input base visual content;
   receiving as an input a user defined image division structure dividing the base visual content;
   generating a content division sure that divides the base visual content into a plurality of image slices, including instructions operable to cause the computer to generate image slices corresponding to the user-defined image division structure;
   receiving input from a user selecting one of the plurality of image slices as a trigger slice and an input selecting a trigger event to associate with the trigger slice;
   receiving input from the user defining intermediate visual content for each trigger event, including instructions operable to cause the computer to allow the user to create and modify intermediate visual content as an integral image without regard to boundaries of user created slices and program-generated slices;

generating a set of viewing image files containing viewing visual content derived from the base visual content;

using the content division structure to divide the intermediate visual content and the viewing visual content into slices corresponding to the slices of the base visual content; and computationally comparing the base visual content and the intermediate visual content, identifying image slices where the base visual content and the intermediate visual content differ visually and generating a set of swap image files containing swap visual content derived from the identified image slices of the intermediate visual content.

19. The method of claim 18, further comprising:

generating a set of HTML instructions that cause the viewing visual content to be displayed as a valid HTML table; and generating a set of JAVASCRIPT instructions that cause the swap visual content to be displayed when the trigger event occurs to the trigger slice.

20. The method of claim 18, wherein the swap image files are opted for transmission over a computer network.

21. The method of claim 18, wherein each slice of the base visual content and the intermediate visual content is computationally compared pixel-by-pixel.

22. The method of claim 18, wherein each slice of the base visual content and the intermediate visual content is computationally compared by comparing a checksum value calculated for each slice of the base visual content and a checksum value calculated for the corresponding slice of the intermediate visual content.

* * * * *

UNITED STATES PATENT AND TRADEMARK OFFICE
CERTIFICATE OF CORRECTION

PATENT NO. : 6,964,017 B1
APPLICATION NO. : 09/558567
DATED : November 8, 2005
INVENTOR(S) : Doug J. Ahmann et al.

It is certified that error appears in the above-identified patent and that said Letters Patent is hereby corrected as shown below:

Column 12, line 53, delete "a generate", and replace with --generate--;
Column 13, line 67, delete "a receive" and replace with --receive--;
Column 14, line 54, delete "sure" and replace with --structure--.

Signed and Sealed this

First Day of August, 2006

JON W. DUDAS
*Director of the United States Patent and Trademark Office*